(12) United States Patent
Sharma et al.

(10) Patent No.: US 12,192,958 B2
(45) Date of Patent: Jan. 7, 2025

(54) COMMUNICATIONS DEVICE, INFRASTRUCTURE EQUIPMENT, CORE NETWORK PART AND METHODS

(71) Applicant: Sony Group Corporation, Tokyo (JP)

(72) Inventors: Vivek Sharma, Basingstoke (GB); Hideji Wakabayashi, Basingstoke (GB); Yuxin Wei, Basingstoke (GB); Yassin Aden Awad, Basingstoke (GB); Anders Berggren, Lund (SE)

(73) Assignee: Sony Group Corporation, Tokyo (JP)

( * ) Notice: Subject to any disclaimer, the term of this patent is extended or adjusted under 35 U.S.C. 154(b) by 383 days.

(21) Appl. No.: 17/765,452

(22) PCT Filed: Sep. 28, 2020

(86) PCT No.: PCT/EP2020/077130
§ 371 (c)(1),
(2) Date: Mar. 31, 2022

(87) PCT Pub. No.: WO2021/069250
PCT Pub. Date: Apr. 15, 2021

(65) Prior Publication Data
US 2022/0338162 A1    Oct. 20, 2022

(30) Foreign Application Priority Data
Oct. 10, 2019   (EP) .................................... 19202578

(51) Int. Cl.
*H04W 68/02* (2009.01)
*H04W 88/06* (2009.01)

(52) U.S. Cl.
CPC ............ *H04W 68/02* (2013.01); *H04W 88/06* (2013.01)

(58) Field of Classification Search
CPC .............................. H04W 68/02; H04W 88/06
(Continued)

(56) References Cited

U.S. PATENT DOCUMENTS

2016/0135213 A1*   5/2016   Zhu .......................... H04L 1/00
                                                                370/329

FOREIGN PATENT DOCUMENTS

WO     2015/000157 A1    1/2015
WO     2017/006265 A1    1/2017

OTHER PUBLICATIONS

International Search Report and Written Opinion mailed on Dec. 9, 2020, received for PCT Application PCT/EP2020/077130, Filed on Sep. 28, 2020, 17 pages.
(Continued)

*Primary Examiner* — Qutbuddin Ghulamali
(74) *Attorney, Agent, or Firm* — XSENSUS LLP

(57) ABSTRACT

A method of communicating using a communications device, the method comprises determining a plurality of time periods during which a paging message may be received in a first wireless network, entering a connected mode in a second wireless network, transmitting an assistance information indication in the second wireless network, entering an idle mode in the second wireless network, and while in the idle mode in the second wireless network, receiving in the second wireless network a paging message at a paging time, wherein the assistance information indication is for permitting the second wireless network to determine the paging time for transmitting the paging message such that the communications device is able to receive the paging message at the paging time and is not prevented from receiving a paging message transmitted in the first wireless network during any of the plurality of time periods.

18 Claims, 5 Drawing Sheets

(58) Field of Classification Search
USPC .......................................................... 455/458
See application file for complete search history.

(56) References Cited

OTHER PUBLICATIONS

LG Electronics, "Support for paging reception for UE with Multiple SIMs", 3GPP TSG-SA WG Meeting #86, S1-191073, May 6-10, 2019, 3 pages.

3GPP, "Evolved Universal Terrestrial Radio Access Network (E-UTRAN); S1 Application Protocol (S1AP) (Release 15)", 3GPP TS 36.413 V15.7.1, Oct. 2019, pp. 1-388.

Vivo, "Report of phase 1 Multi-SIM email discussion", 3GPP TSG-RAN WG Meeting #85, RP-191898, Sep. 16-20, 2019, 36 pages.

Nokia et al., "Revised SID: Study on NR Industrial Internet of Things (Iot)", 3GPP TSG RAN meeting #81, RP-182090, Sep. 10-13, 2018, 5 pages.

Holma et al., "LTE for UMTS OFDMA and SC-FDMA Based Radio Access", John Wiley & Sons, 2009, 232 pages.

3GPP, "Radio Resource Control (RRC); Protocol specification (Release 15)", 3GPP TS 36.331 V15.7.0, Sep. 2019, pp. 1-962.

3GPP, "System Architecture for the 5G System; Stage 2 (Release 16)", 3GPP TS 23.501 V16.0.0, Mar. 2019, pp. 1-318.

3GPP, "NR; NR and NG-RAN Overall Description; Stage 2 (Release 15)", 3GPP TS 38.300 V15.7.0, Sep. 2019, pp. 1-99.

Arkko et al., "Extensible Authentication Protocol Method for 3rd Generation Authentication and Key Agreement (EAP-AKA)", Network Working Group, Request for Comments: 4187, Jan. 2006, pp. 1-79.

Vivo, "Proposal for 2nd phase of email discussion on Multi-SIM REL-17 work", 3GPP TSG-RAN WG Meeting #85, RP-192297, Sep. 16-20, 2019, 1 page.

3GPP, NR; Radio Resource Control (RRC) protocol specification (Release 15), 3GPP TS 38.331 V15.7.0, Sep. 2019, pp. 1-527.

3GPP, "User Equipment (UE) procedures in Idle mode and RRC Inactive state (Release 15)", 3GPP TS 38.304 V15.2.0, Dec. 2018, pp. 1-28.

* cited by examiner

COMMUNICATIONS DEVICE, INFRASTRUCTURE EQUIPMENT, CORE NETWORK PART AND METHODS

CROSS-REFERENCE TO RELATED APPLICATIONS

The present application is based on PCT filing PCT/EP2020/077130, filed Sep. 28, 2020, which claims priority to EP 19202578.1, filed Oct. 10, 2019, the entire contents of each are incorporated herein by reference.

BACKGROUND

Field

The present disclosure relates to communications devices, infrastructure equipment, core network parts and methods of communicating in a wireless communications network by a communications device.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected that future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new Radio Access Technology (RAT) systems [1], as well as future iterations/releases of existing systems, to efficiently support connectivity for a wide range of devices associated with different applications and different characteristic data traffic profiles.

Communications devices having multiple SIM applications (e.g. on multiple so-called 'SIM cards') have been available for some time. However, there remain technical challenges in supporting such communications devices in wireless communications networks.

SUMMARY

The present disclosure can help address or mitigate at least some of the issues discussed above.

Embodiments of the present technique can provide a method of communicating using a communications device registered in a first communications network and a second communications network, the first and second communications networks being cellular wireless communications networks. The method comprises determining a plurality of time periods during which a downlink transmission for the communications device may be received in the first communications network according to a time divided schedule, transmitting an assistance information indication in the second communications network, controlling a receiver of the communications device to monitor a wireless access interface in the second communications network for a downlink transmission for the communications device at a first monitoring time, wherein the assistance information indication is for the second communications network to select, as a first transmission time for transmitting the downlink transmission, the first monitoring time, such that the communications device is not prevented from receiving another downlink transmission for the communications device transmitted in the first communications network during one or more of the plurality of time periods, by monitoring the wireless access interface in the second communications network at the first monitoring time.

Embodiments of the present technique can therefore provide a means of ensuring that a communications device which is registered in two communications networks is able to receive downlink transmissions in one communications network, irrespective of monitoring for downlink transmissions in the other.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
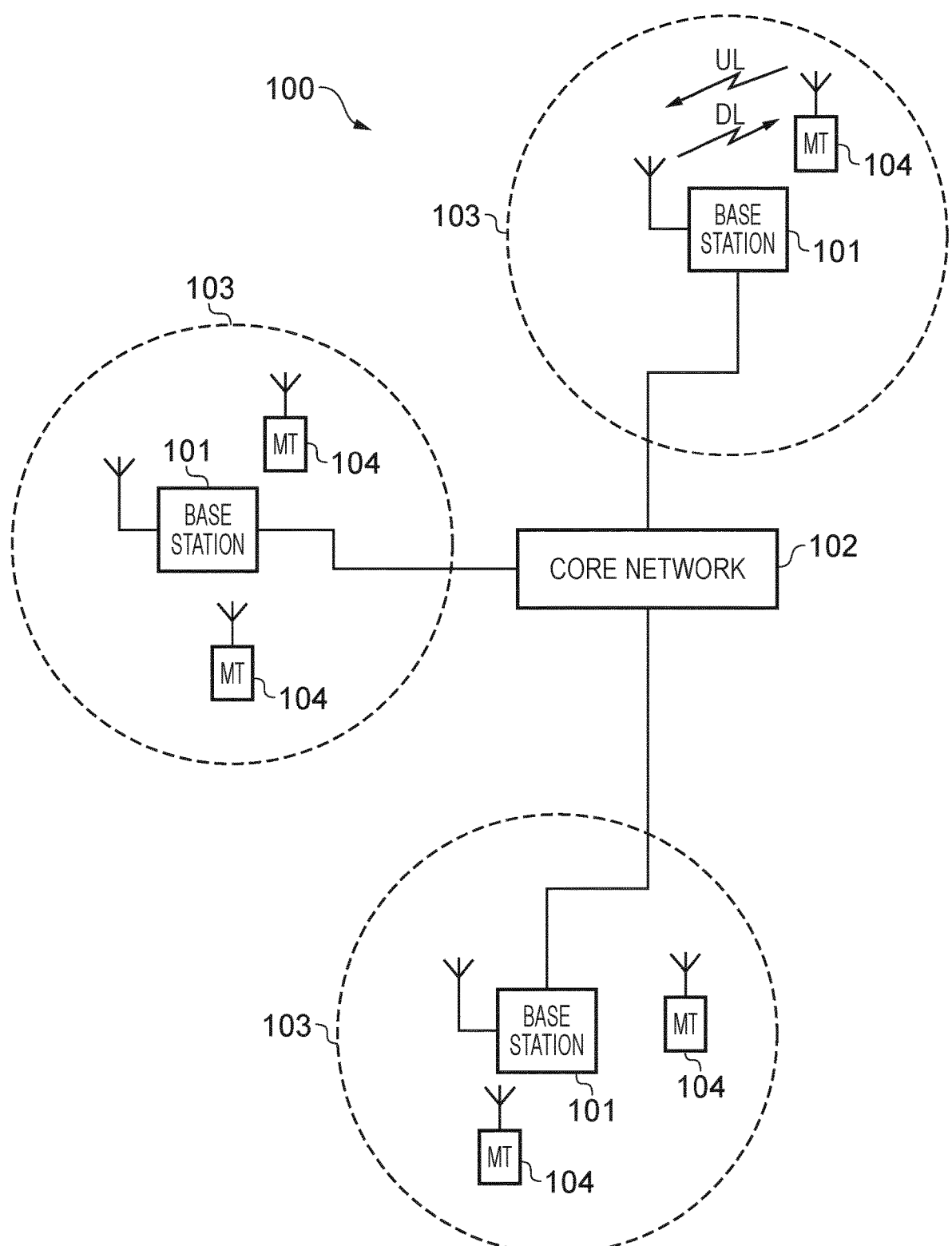
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
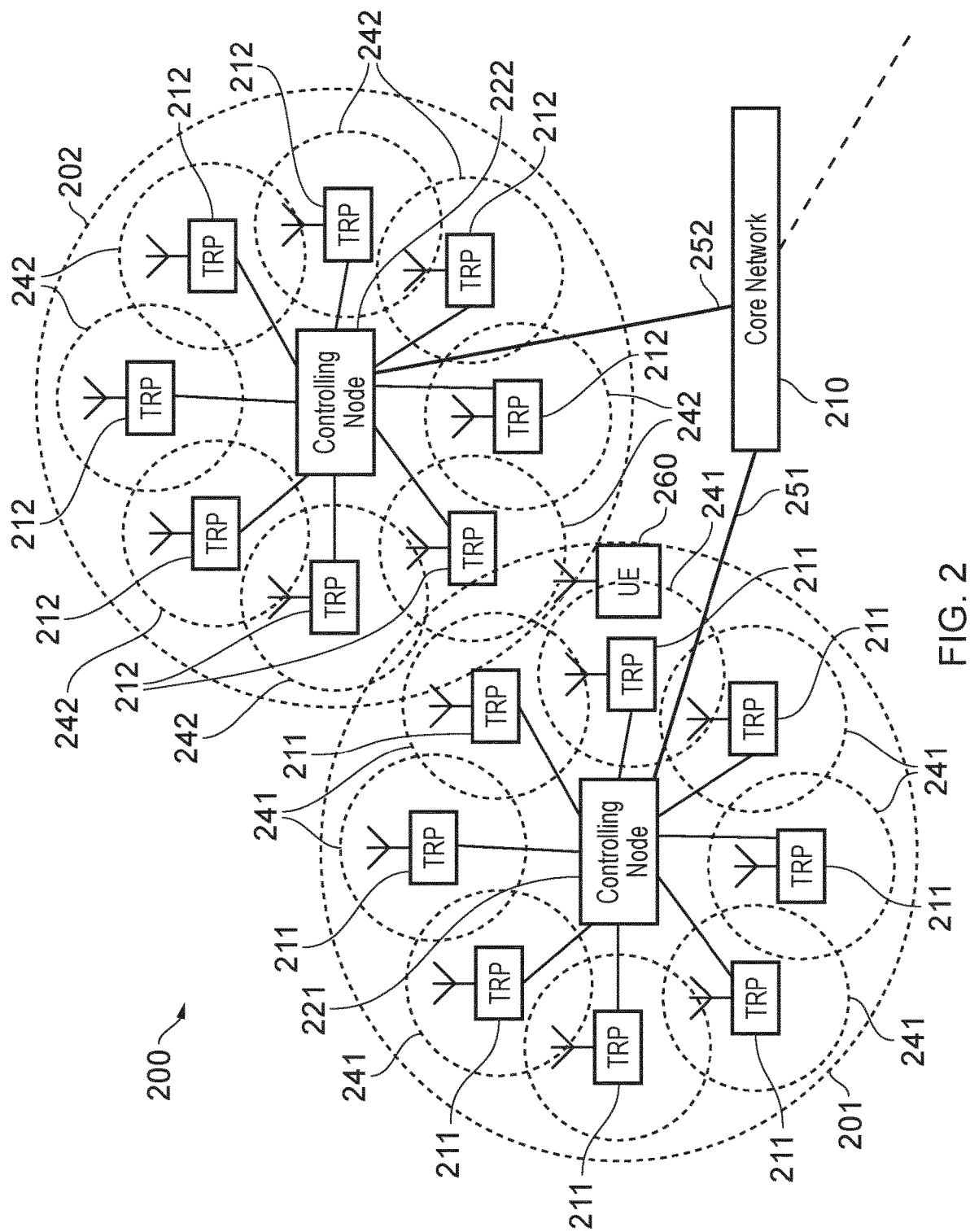
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new Radio Access Technology (RAT) wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communications cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
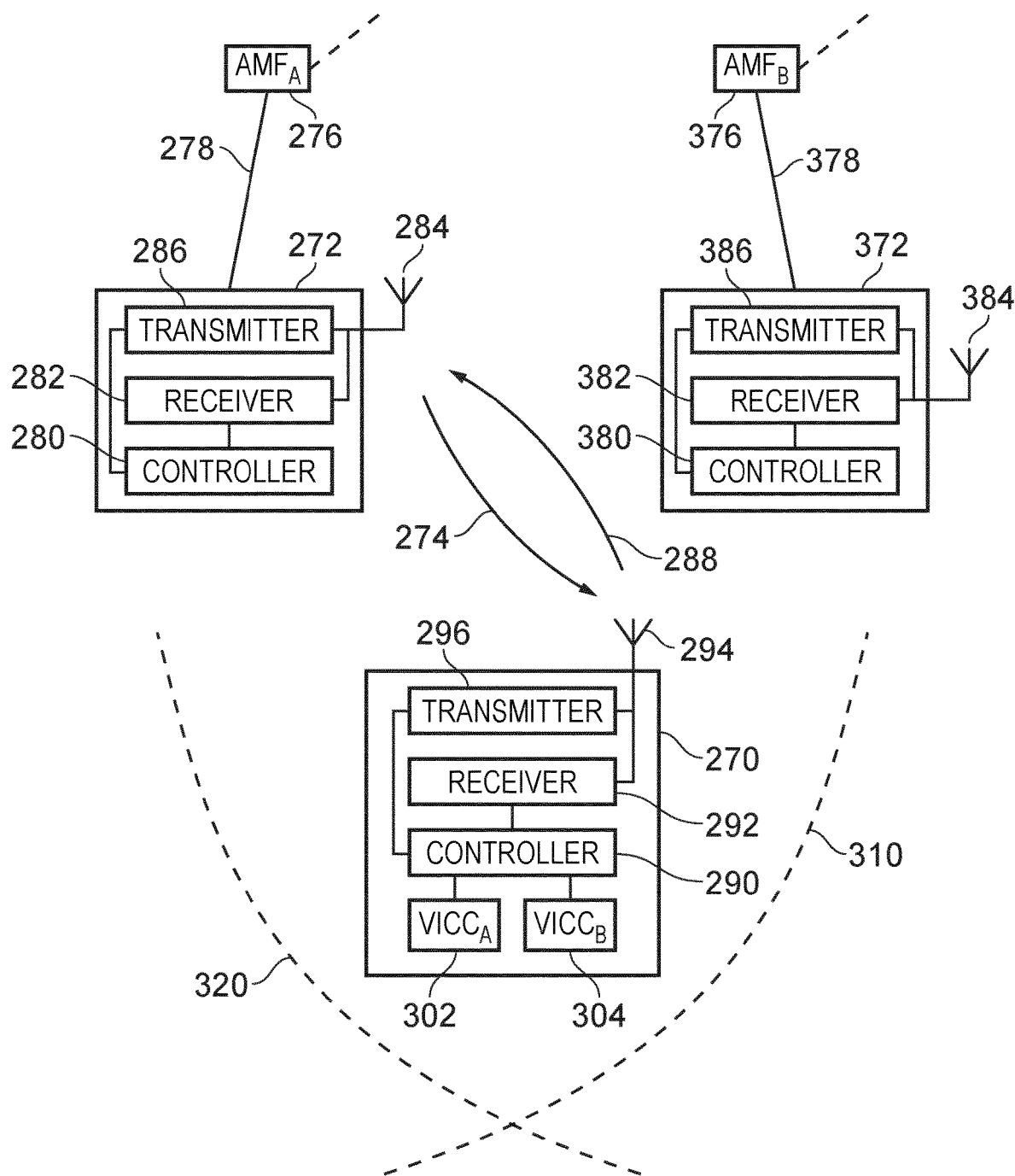
FIG. 3 is a schematic block diagram of example infrastructure equipment and communications device which may be configured in accordance with certain embodiments.

FIG. 3 illustrates schematically a UE/communications device 270, and example first and second wireless communications networks. The first communications network comprises first network infrastructure equipment 272 and first core network equipment 276. The second communications network comprises second network infrastructure equipment 372 and second core network equipment 376.

The communications device 270 may be thought of as an example of the communications device 104 of FIG. 1 or of the UE 260 of FIG. 2. Each of the first and second infrastructure equipment 272, 372, may be thought of as a gNB 101 or a combination of a controlling node 221 and TRP 211. Controller 280 of the first infrastructure equipment 272 is connected to the first core network part 276 via interface 278, and controller 380 of the second infrastructure equipment 272 is connected to the second core network part 376 via interface 378.

The first and second core network equipment 276, 376 may each comprise a respective access and mobility management function (AMF) providing an endpoint for a non-access stratum (NAS) control plane for the UE 270. User plane data may be transmitted via further core network entities comprising a user plane function (UPF), not shown in FIG. 3 for conciseness.

The first infrastructure equipment 272 includes a receiver 282 connected to an antenna 284 and a transmitter 286 connected to the antenna 284. Similarly, the second infrastructure equipment 372 includes a receiver 382 connected to an antenna 384 and a transmitter 386 connected to the antenna 384.

Correspondingly, the UE 270 includes a controller 290 connected to a receiver 292 which receives signals from an antenna 294 and a transmitter 296 also connected to the antenna 294.

The controllers 280, 380 are configured to control the first and second infrastructure equipment 272, 372 respectively and may comprise processor circuitry which may in turn comprise various sub-units/sub-circuits for providing functionality as explained further herein. These sub-units may be implemented as discrete hardware elements or as appropriately configured functions of the processor circuitry. Thus the controllers 280, 380 may comprise circuitry which is suitably configured/programmed to provide the desired functionality using conventional programming/configuration techniques for equipment in wireless telecommunications systems. The transmitters 286, 386 and the receivers 282, 382 may comprise signal processing and radio frequency filters, amplifiers and circuitry in accordance with conventional arrangements. The transmitters 286, 386, the receivers 282, 382 and the controllers 280, 380 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272, 372 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

Correspondingly, controllers (not shown) within the first and second core network parts 276, 376 are configured to control the respective first and second core network parts 276, 376 and may comprise processor circuitry, memory, and interfaces for connecting the core network parts to respective infrastructure equipment and other entities within the communications networks.

The UE 270 may also include a first universal integrated circuit card (UICC) 302 and a second UICC 304 operable to support respective first and second subscriber identity module (SIM) applications (not shown). In some embodiments, one or both of the first and second UICCs 302, 304 is an embedded UICC (eUICC).

In some embodiments, the first and second SIM applications may run within a trusted module of the controller 390.

Each SIM application provides credentials for authenticating the UE 270 with core network entities, such as the first and second core network parts 276, 376 and may provide means for generating encryption and/or integrity keys for ensuring, respectively, confidentiality and integrity of communications between the UE 270 and the wireless access networks.

In some embodiments of the present technique, the first and second infrastructure equipment generate respective wireless access interfaces in accordance with a cellular radio technology such as one of the technologies (e.g. 3GPP LTE, 3GPP UMTS, 3GPP 'NR' and their respective variants) specified by 3GPP®. In some embodiments, both radio technologies are the same. In some other embodiments, the radio technologies are different (e.g. the first cell is operated in accordance with 3GPP LTE standards, and the second cell is operated in accordance with 3GPP NR standards).

The controllers 280, 380, 290 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

The first infrastructure equipment 272 controls a first cell 310 of the first wireless communications network in which the communications device 270 receives downlink data from the first infrastructure equipment 272 via resources of a wireless access interface as illustrated generally by an arrow 274, and transmits uplink data to the first infrastructure equipment 272 via resources of the wireless access interface as illustrated generally by an arrow 288.

The second infrastructure equipment 372 controls a second cell 320, which forms a part of the second network.

Multiple SIM Applications/Subscriptions

As described above, by virtue of the multiple SIM applications, the communications device 270 may be associated with multiple subscriptions. Each subscription may be associated with a different subscriber identity.

For example, one subscriber identity may be associated with (i.e. permit access to) services provided by a first wireless communications network and another may be associated with services provided by a second wireless communications network. In order to register with a core network entity such as an AMF, the communications device 270 must use the appropriate security keys derived from the identity corresponding to the applicable subscription.

Although UEs supporting multiple active SIM applications have conventionally been available for some time, wireless communications networks have not provided any specific support for communications devices having multiple active SIM applications. A wireless network may behave, with respect to the communications device, as if it has only a single SIM application.

Accordingly, a UE having multiple active SIM applications may not be able to communicate with different networks, using both subscriptions simultaneously. In particular it may not be possible for the communications device/UE to receive paging messages which are simultaneously transmitted (or transmitted very close in time to each other) to it in both networks.

There is thus a need to improve the functionality and capabilities of communications device having multiple active SIMs and respective subscriptions.

Embodiments of the present technique can provide a method of communicating using a communications device registered in a first communications network and a second communications network, the first and second communications networks being cellular wireless communications networks, the method comprising: determining a plurality of time periods during which a downlink transmission for the communications device may be received in the first communications network according to a time divided schedule, transmitting an assistance information indication in the second communications network, controlling a receiver of the communications device to monitor a wireless access interface in the second communications network for a downlink transmission for the communications device at a first monitoring time, wherein the assistance information indication is for the second communications network to select, as a first transmission time for transmitting the downlink transmission, the first monitoring time, such that the communications device is not prevented from receiving another downlink transmission for the communications device transmitted in the first communications network during one or more of the plurality of time periods, by monitoring the wireless access interface in the second communications network at the first monitoring time.

Embodiments of the present technique can provide a means for ensuring that a communications device which has is registered in two networks (e.g. because it has two SIM applications) can receive paging messages which are triggered in different networks and close together in time, by ensuring that a radio access network is able to select a paging time which is consistent with an indication from the communication device directly, or from a core network part based on a notification from the communications device. The notification or indication from the communications device may be based on paging parameters applicable in a different wireless communications network. Accordingly, the selected paging time can be assured to differ from one or more paging occasions at which a paging message may be transmitted in the different wireless communications network.

Paging Opportunities in Idle Mode and Connected Mode Discontinuous Reception (DRX)

Paging refers to the transmission of a notification from the wireless communications network to a communications device, to notify the communications device of pending downlink data or control information transfer, or of an update to system information relating to a cell of the wireless communications network.

In order to avoid unnecessary power consumption by the communications device, the wireless communications network is limited to transmitting paging messages at certain times, referred to as 'paging opportunities'. The paging opportunities for a particular communications device are known to the communications device. For example, they may be determined in accordance with predetermined parameters, such as parameters broadcast in the system information of a cell, and/or an identity associated with the communications device.

A communications device which is not otherwise engaged in active communications in the network (e.g. is in a radio resource control, RRC, idle state) can operate in a low power mode of operation (e.g. in which some or all parts of its receiver circuitry are disabled) during times outside of the paging opportunities.

Similarly, to reduce power consumption during a connected mode (such as an RRC connected mode) when downlink data transmissions may be intermittent, a communications device can be configured to operate in a discontinuous reception (DRX) mode [6][5]. Similarly to the principle of paging opportunities, when the communications device is in the DRX mode, the network is restricted to transmitting downlink messages to the communications device only during certain times, in accordance with the DRX configuration. In particular, the DRX configuration may permit the communications device to monitor a control channel (such as a physical downlink control channel, PDCCH) only at certain times.

A downlink message transmitted in accordance with the DRX configuration may trigger the communications device to leave the DRX mode, for example to receive a large quantity of downlink data.

Various conventional techniques provide for a communications device to request a communications network to schedule future transmissions taking into account a constraint at the communications device.

For example, 3GPP LTE specifications provide for [7] an in-device coexistence (IDC) indication. An IDC indication may conventionally be transmitted by the communications device if it is unable to receive LTE transmissions using a particular receiver (or receiver circuitry) due to the operation of transmitter or receiver functionality associated with a different radio technology, in particular where the different radio technology operates in so-called 'unlicensed spectrum'. Examples of such radio technologies include those that operate in the industrial, scientific and medical (ISM) frequency bands, and include for example IEEE 802.11/ WiFi and Bluetooth.

An IDC indication may indicate future time periods (e.g. a time division multiplexing, TDM, pattern) during which the wireless communications network is requested to refrain from transmitting to the communications device, to permit the communications device to operate during those time periods using the different radio technology.

Similarly, conventional techniques provide for the transmission of "UE Assistance Information" by the communications device, to request an offset in time to an existing DRX configuration. For example, the UE Assistance information may request that 'on' and 'off' times (when the communications device is, and is not, respectively, required to monitor a downlink control channel) are shifted relative to an existing DRX configuration.

In 3GPP NR, different gNBs may apply different shifts to their respective Paging Frame (PF) schedules, so that different cells have non-overlapping paging frame occurrences. This may reduce interference caused by overlapping paging frames in nearby cells. However, communications devices registered in two networks conventionally may not benefit from such offsets, because the offsets will be applied having regard to each network individually, and do not prevent overlapping paging frames in cells of the different networks.

Figure 4:
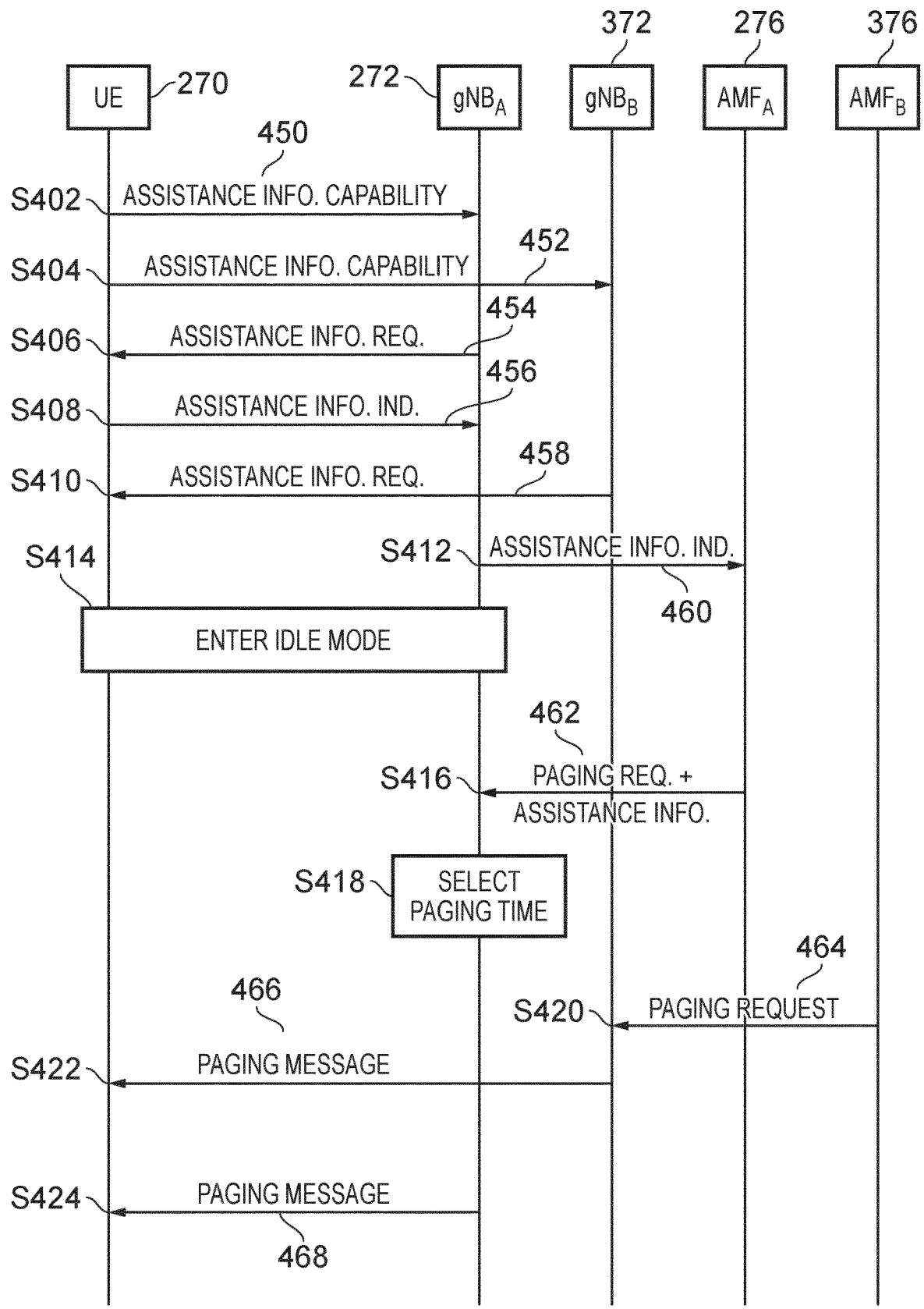
FIG. 4 is a combined message sequence chart and process flowchart for transmissions by a communications device, first and second infrastructure equipment, and first and second core network parts in accordance with embodiments of the present technique.

FIG. 4 is a combined message sequence chart and process flowchart for transmissions by the communications device 270 the first infrastructure equipment 272, the second infrastructure 372, the first core network part 276, and the second core network part 376, in accordance with embodiments of the present technique.

In the example of FIG. 4, the communications device 270 has performed a registration procedure (e.g. attach procedure) in two communications networks, and has performed an authentication procedure in each of the networks. For example, the communications device may have performed the authentication procedures based on credentials associated with a respective active SIM application.

The communications device 270 is initially in idle mode in respective cells of the networks, such as cells 310, 320 shown in FIG. 3. The communications device 270 may determine paging opportunities in each network, in accordance with conventional techniques. For example, the paging opportunities may be based on one or more of the radio technology used in the respective cell, a temporary identity assigned to the communications device 270 in the respective cell, and parameters transmitted in the cell by the respective infrastructure equipment 272, 372, such as in system information.

The sequence illustrated in FIG. 4 starts at step S402 in which the communications device 270 transmits an assistance information capability indication 450 to the first infrastructure equipment 272. At step S404, the communications device 270 sends a second assistance information capability indication 452 to the second infrastructure equipment 372. Steps S402 and S404 may occur as part of the registration procedures described above.

In response to receiving the assistance information capability indication 450, the first infrastructure equipment 272 transmits at step S406 an assistance information request message 454 requesting the communications device 270 to provide assistance information. In particular, the assistance information may permit the first infrastructure equipment 272 (or other infrastructure equipment in the same network) to select a timing for a transmission of a paging message (or other downlink transmission) to the communications device 270 which is compatible with the scheduling of paging occasions at which another infrastructure equipment, such as the second infrastructure equipment 372, may transmit paging messages to the communications device.

At step S408, the communications device transmits an assistance information indication 456 to the first infrastructure equipment 272, in response to the request. The assistance information indication 456 may be based on a determination of the plurality of paging occasions at which the second infrastructure equipment 372 may transmit paging messages to the communications device 270. As described above, this may be based on, for example, system information received from the second infrastructure equipment 372, and a temporary identity assigned in the second network, such as by the second core network part 376. In some embodiments of the present technique the temporary identity is a 5G-S-TMSI, based on which the paging occasions may be determined.

In some embodiments, the assistance information indication 456 may comprise an indication that the reason for transmitting the assistance information indication 456 is because the communications device 270 supports simultaneous registration in two networks, e.g. because it has two active SIM applications.

The assistance information indication 456 represents a request to the first network to refrain from transmitting downlink messages (e.g. paging messages and/or control messages indicating allocated resources for the transmission of downlink data) to the communications device during certain times. The assistance information indication 456 may indicate that the communications device is unable to receive downlink transmissions transmitted in the first during the certain times, because it is registered in a second network and may receive downlink transmissions during the certain times in the second network, and thus will refrain from monitoring a wireless access interface in the first network during the certain times.

In some embodiments, the assistance information indication 456 may comprise an indication of one or more time division multiplexing (TDM) patterns, each pattern representing a time period which repeats, the pattern indicating the certain times as being portions during the repeating time period during which the communications device may receive, according to the specifications and any specific configuration related to the second network, a downlink transmission in the second network.

In some embodiments, the communications device 270 may be configured with DRX parameters applicable in the first cell 310 when the communications device 270 is in connected mode. The assistance information indication 456 may comprise a requested time offset to the DRX pattern corresponding to the DRX parameters.

In some embodiments, the assistance information indication 456 may comprise an enhanced IDC indication. Preferably, the enhanced IDC indication comprises an indication of one of a plurality of durations, the plurality of durations corresponding to different durations of a requested TDM pattern as described above.

Preferably, the communications device 270 is able to indicate a requested TDM pattern duration in one network (e.g. the first network) which is equal a paging cycle duration applicable for the communications device 270 in another network (e.g. the second network). Thus, preferably, the plurality of durations comprise the plurality of possible paging cycle durations in the second network.

In some embodiments, the plurality of durations comprises a duration corresponding to a paging cycle of 32 radio frames of the wireless access interface of the second network. For example, where a radio frame has a duration of 10 milliseconds (ms), the plurality of durations comprises a duration of 320 ms.

Preferably, in some embodiments, the plurality of durations comprise the plurality of paging cycle durations which are possible in accordance with one or more radio access technologies. For example, in some embodiments, the plurality of durations comprise the permitted paging cycle durations in a 3GPP LTE cell and the permitted paging cycle durations in a cell using 3GPP "3G" radio technology (e.g. including standards such as 3GPP UMTS, 3GPP HSPA and variants thereof).

Preferably, the plurality of durations comprise the plurality of paging cycle durations which are possible in accordance with the radio access technology used in the network in which the communications device sends the assistance information indication 456.

In some embodiments, the assistance information indication 456 is transmitted within RRC signalling.

At step S410, the second infrastructure equipment 372 also transmits an assistance information request message 458 to the communications device 270. The communications device 270 determines that it has already responded to an earlier assistance information request message from a different infrastructure equipment in a different wireless communications network. Accordingly, in order to avoid both the first and second wireless communications networks from adapting their future paging transmissions to accommodate each other, and therefore the possibility that future paging occasions for both networks may collide, the communications device 270 refrains from responding to the second assistance information request message 458.

At step S412, the first infrastructure equipment 272 forwards the assistance information indication 456 to the first core network entity 276 in a message 460. The first core network part 276 stores the received assistance information indication and associates it with the communications device 270. In particular the first core network part 276 stores the assistance information indication irrespective of whether the communications device 270 remains in a connected mode, or remains within a cell served by the first infrastructure equipment 272. In some embodiments, the assistance information indication 456 may be forwarded substantially unchanged.

In some embodiments, additionally or alternatively (not shown in FIG. 4) the first infrastructure equipment 272 may forward the assistance information indication to other infrastructure equipment associated with cells within a RAN notification area of the communications device, if the communications device enters INACTIVE state. The assistance information indication may be passed with context information associated with the communications device as part of a Context fetch procedure.

At step S414, the communications device 270 enters an idle mode in a cell controlled by the first infrastructure equipment 272 (such as the first cell 310). In some embodiment, the first infrastructure equipment 272 may accordingly delete certain context information associated with the communications device 270, such as the received assistance information indication 456.

While in the idle mode, the communications device 270 may control its receiver 292 or receiver circuitry to monitor a paging channel of the second infrastructure equipment 372 in accordance with the paging opportunities in the second cell 320 for the communications device 270. At other times, the communications device 270 controls its receiver 292 or receiver circuitry to monitor a paging channel of the first infrastructure equipment 272.

Subsequently at step S416, the first core network part 276 determines that downlink data or other information is to be transmitted to the communications device 270 and accordingly forms a paging request message to be transmitted to the first infrastructure equipment 272. The paging request message 462 is transmitted to the first infrastructure equipment 272 together with assistance information stored in response to receiving the assistance information indication 460 at step S412.

In some embodiments, the paging request message 462 and the assistance information indication 460 may be sent by the first core network part 276 to multiple infrastructure equipment (e.g. gNBs) in the first network, such as to infrastructure equipment controlling cells which are in a same tracking area as the cell in which the assistance information indication 456 was transmitted.

In the example of FIG. 4, the first infrastructure equipment 272 receives the assistance information indication from the first core network part 276. In some embodiments, an infrastructure equipment receives the assistance information indication from another infrastructure equipment. For example, in respect of a communications device in a connected mode, an infrastructure equipment associated with a serving cell ('old serving cell') of the communications device may determine that the communications device is about to, or has, changed cell so that a second cell ('target' cell) is now the serving cell.

Accordingly, the infrastructure equipment associated with the old serving cell may forward the assistance information indication to infrastructure equipment associated with the target cell.

The change of cell may be by means of a handover procedure (generally, in which a preparation phase occurs prior to the change of cell for preparing the infrastructure equipment associated with the target cell) or a cell reselection procedure (generally, where the communications device makes an autonomous decision to change cell). The cell reselection procedure may occur while the communications device is in the INACTIVE state.

If the infrastructure equipment associated with the old serving cell determines that the communications device is in the INACTIVE state, then the infrastructure equipment may forward the assistance information indication to each of a plurality of other infrastructure equipment which are associated with cells within a radio access network (RAN) notification area for the communications device, as described above, without determining whether the serving cell of the communications device has in fact changed.

In some embodiments, the assistance information indication 460 is transmitted within the first network (e.g. to and/or from the first core network part 276 to the one or more infrastructure equipment, such as the first infrastructure equipment 272) within a container. In some embodiments, when transmitted from the first core network part 276 to an infrastructure equipment, the container may further comprise a paging optimization indication indicating a list of supported frequency bands. The paging optimization indication may be a conventional indication (e.g. as specified in 3GPP Release 15 for NR) for avoiding the transmission of paging messages in cells in which the communications device 270 is unlikely to be currently located.

At step S418, in response to receiving the paging request 462 and the assistance information at step S416, the first infrastructure equipment 272 determines a paging time for transmission of a paging message to the communications device 270. In particular the first infrastructure equipment 272 takes into account the assistance information which allows the first infrastructure equipment 272 to select a paging time such that a paging message transmitted at that paging time can be received by the communications device 270 and, in receiving that paging message at that time, the communications device 270 is not prevented from receiving a further paging message transmitted in the second wireless communications network, such as by the second infrastructure equipment 372.

In the example shown in FIG. 4, at step S420, the second core network part 376 also determines that downlink information is to be transmitted to the communications device 270 in the second wireless communications network and accordingly transmits a paging request message 464 to the second infrastructure equipment 372. The paging request message 464 is not accompanied by assistance information, because no assistance information was provided to the second wireless communications network by the communication device 272. Accordingly at step S422, the second infrastructure equipment 372 selects a paging time and transmits the paging message 466 without reference to any indication of time periods when the communications device 272 may receive a paging message in the first wireless communications network. For example, the paging message 466 may be transmitted broadly in accordance with conventional techniques.

At step S424, the time selected at step S418 by the first infrastructure equipment 272 for the transmission of the paging message occurs, and the first infrastructure equipment 272 accordingly transmits the paging message 468. It will thus be appreciated that by selecting a paging time in accordance with assistance information received from the first core network entity 276, the scheduling of the transmission of the paging message 468 is such that the communications device 270 is able to receive both the paging message 466 transmitted in the second wireless communications network, and the paging message 468 transmitted in the first wireless communications network.

Infrastructure Equipment-Generated Indication

In some embodiments, a first assistance information indication is transmitted in the first network, as described above. In addition, a second multi-network registration indication is transmitted in the second network indicating that the communications device is registered in two or more networks including the second network. The second network, in response to receiving the multi-network registration indication, selects a paging pattern for the communications device from a plurality of paging patterns (each paging pattern defining a plurality of time periods during which paging messages may be transmitted), the selected paging pattern being selected based on the multi-network registration indication, such that it differs from a paging pattern selected in the first network in response to the assistance information indication.

In general, in some embodiments, indications are sent to two or more networks in which the communications device is registered, the indications differing in some manner Each network determines based on a received indication that the communications device is registered in one or more additional network, and accordingly determines a schedule of downlink transmission times which do not conflict with a schedule of downlink transmission times selected by each of the other networks receiving the different indications.

In some embodiments, an indication sent to one network may be based on information transmitted in another, such as a selected paging opportunity (PO) schedule broadcast in an LTE network in accordance with some embodiments, as described further below.

In some embodiments, such as those in which the different indications are transmitted, a schedule of downlink transmission times may be determined at least in part at the infrastructure equipment, for example, at the first infrastructure equipment 272 (and not solely at the communications device 270). In such embodiments, the assistance information indication 460 which is transmitted to the core network part 276 or to other infrastructure equipment (not shown in FIG. 4) may be formed by the first infrastructure equipment 272.

In some embodiments, such as those where the schedule of downlink transmission times may be determined at least in part at the infrastructure equipment, an indication of the schedule may be transmitted to the communications device, for example as an assistance information response indication (not shown in FIG. 4).

Selection of Network

Embodiments of the present technique provide a method of selection of a network, from two networks with which a communications device is registered, in which the communications device transmits an assistance information indication.

In some embodiments, the selection is in response to registering with a second network, when the communications device is already registered with a first network.

In some embodiments, a determination to transmit assistance information in a network is based on one or more of receiving a request for the transmission of the assistance information in the network, entering a connected mode in the network, and a variable indicating that no assistance information has been sent in a different network to which the communications device is currently registered.

Embodiments can thus avoid a transmission of assistance information to two different networks in respect of the same communications device, which could lead to both networks adjusting paging opportunities and/or a DRX configuration such that the adjusted configurations also conflict.

Embodiments can additionally or alternatively ensure that a transmission of assistance information is transmitted to the most appropriate network.

Embodiments can additionally or alternatively ensure that a transmission of assistance information is transmitted to the most appropriate network in an appropriate format.

In some embodiments, the communications device 270 maintains a variable, referred to herein as "MUSIM_assistance_sent", which is indicative of whether or not assistance information has been sent to at least one communications network. In some embodiments, it is a Boolean indicator, set to FALSE initially. The variable MUSIM_assistance_sent may further remain TRUE only while the assistance information is valid in the network in which it was sent.

When assistance information is sent to one network it is set to TRUE, and remains TRUE for as long as the communications device is in a connected mode in one or both of the networks. The variable is set to FALSE again only when the communications device is in idle mode in both networks. For the purposes of these embodiments, an inactive state (such as RRC INACTIVE in 3GPP NR) is considered an active state. In general an idle state is a state in which a radio access network part of a communications network does not maintain a context associated with the communications device.

Figure 5:
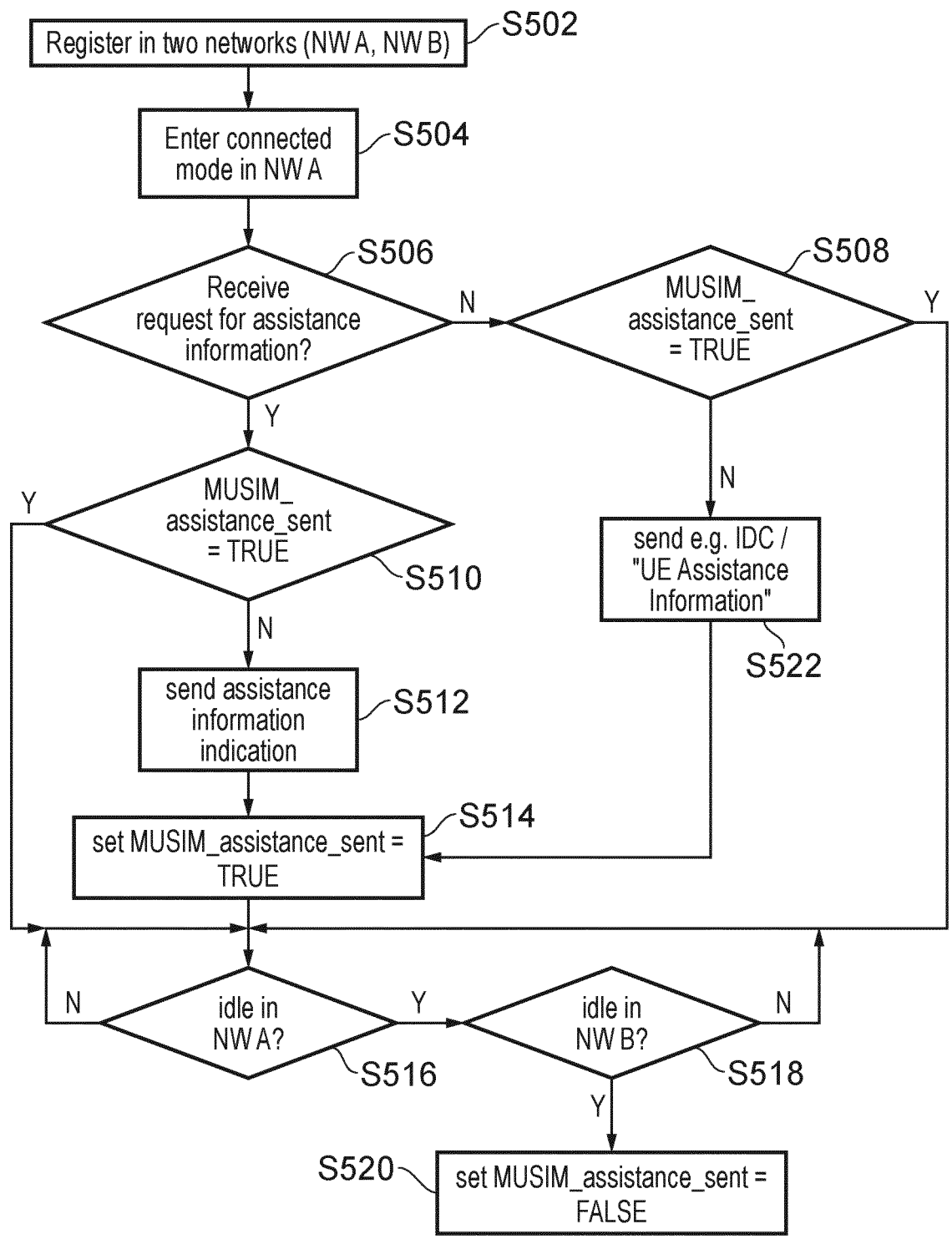
FIG. 5 is a flow chart for a process carried out by a communications device in accordance with embodiments of the present technique.

FIG. 5 illustrates a flow chart for a process carried out by a communications device in accordance with embodiments of the present technique.

The process of FIG. 5 starts at step S502, in which the communications device 270 is registered in both networks. That is, the communications device has performed authentication in each network using credentials associated with a respective SIM application.

At step S504, the communications device 270 enters a connected mode (e.g. RRC connected mode) in one of the networks, referred to in FIG. 5 as network (NW) A. The process may start in respect of an entry into the connected mode in either of the networks.

At step S506, in response to, or as a part of, entering the connected mode, the communications device determines whether it has received an explicit request in NW A for the assistance information. If no request has been received, the control passes to step S508.

If a request is received, such as the assistance information request message 454 described above, the control passes to step S510.

At step S510, the communications device 270 determines the value of the variable MUSIM_assistance_sent. If the variable is set to TRUE, indicating that assistance information has already been sent in a network, then control passes to step S516, described below.

If the variable is set to FALSE, indicating that no assistance information has been sent in either network since the communications device 270 most recently was in idle mode in both networks, then control passes to step S512.

In step S512, the communications device transmits an assistance information indication, which may correspond to the assistance information indication 456 shown in FIG. 4 and described above. After step S512, control passes to step S514.

At step S514, the communications device 270 updates the MUSIM_assistance_sent variable to TRUE, because it has sent an assistance information indication in the first network (NW A). Control then passes to step S516.

At step S516, the communications device 270 determines whether it has entered an idle mode in the first network, NW A. If not, the control remains ('N') at step S516. If the communications device 270 determines that it has entered an idle mode in the first network, then control passes to step S518, in which the communications device 270 determines whether it has entered an idle mode in the second network, NW B. If it has not, then control returns to step S516. If it has entered the idle mode in NW B, then control passes to step S520.

The effect of the determinations at step S516 and step S518 is that control remains at these steps unless and until the communications device 270 is simultaneously in an idle mode in both the first and second networks, NW A and NW B.

At step S520, the communications device 270 updates the MUSIM_assistance_sent variable to FALSE, because it is in an idle mode in both communications networks.

The process then ends. The process may restart at any time at step S504 when the communications device 270 enters a connected mode in either NW A or NW B.

Returning to step S508, this is broadly the same as step S510 i.e. the communications device 270 determines, based on the variable MUSIM_assistance_sent, whether it has previously sent assistance information to either NW A or NW B. If so (MUSIM_assistance_sent=TRUE), then control passes directly to step S516. If not (MUSIM_assistance_sent=FALSE), then control passes to step S522.

If control reaches step S522, this means that the communications device 270 has entered connected mode in a network which has not requested explicitly any assistance information. This may be because the network does not support the transmission of assistance information, such as the assistance information indication 456 described herein.

However, the network may support the reception of one or more conventional indications which have been specified for the purpose of indicating to the network that the communications device is requesting a particular behaviour by the network in terms of timing of downlink transmissions, such as an IDC indication, or UE Assistance Information as described above. The conventional indications may have been specified within a 3GPP specification release, such as 3GPP Release 15, or an earlier release. Additionally or alternatively, the network may support an enhanced version of a conventional indication, such as the enhanced IDC indication described above.

Accordingly, in step S522 the communications device 270 determines a form of indication supported by the network (NW A), the indication representing a request for an adjustment of timing restrictions applicable to downlink transmissions by the network. This may be based on system information broadcast in the network. For example, the system information may indicate that the radio access network of the network supports both IDC indications and UE Assistance Information.

If no suitable indication is determined to be supported (not shown in the process of FIG. 5), then the process may end. That is, the communications device 270 may enter the connected mode and not send any assistance information to the network. The process may restart from step S504 when the communications device 270 next enters a connected mode in either NW A or NW B.

If the communications device 270 determines that the network supports a suitable indication, then at step S522 the communications device 270 transmits an indication to the network, the indication requesting that restrictions on the transmission of downlink data be applied. For example, the restrictions may be determined based on paging occasions during which the other network (NW B) may transmit paging messages to the communications device 270, such that the effect of the indication transmitted in step S522 is to request NW A to transmit downlink transmissions such that the communications device 270 is not prevented from receiving (or is, on more occasions, able to receive) downlink paging messages transmitted in NW B.

NW A may interpret the indication as a request to restrict the timing of downlink transmission as a request for other purposes, such as for avoiding in-device coexistence issues as described above.

Following the transmission of the indication at step S522, control passes to step S514 and the process continues as described above.

Validity of Assistance Information

In the example process illustrated in FIG. 5 and described above, the communications device 270 'resets' (i.e. sets to FALSE) the variable MUSIM_assistance_sent whenever it becomes idle in both communications networks.

In some embodiments, the variable MUSIM_assistance_sent is not reset if the communications device 270 remains within a pre-determined region within the network in which it transmitted the assistance information indication which resulted in the variable MUSIM_assistance_sent being set to TRUE. For example, the pre-determined region may be a tracking area, or a region associated with the core network node (e.g. AMF) associated with the cell in which the assistance information indication was transmitted.

In some embodiments, the core network entity (e.g. AMF 276 of FIG. 4) provides the assistance information (e.g. as shown at step S416 of FIG. 4 and described above) to all radio access network entities within the pre-determined region, in the event that a paging message is to be transmitted to the communications device 270.

Additionally or alternatively, in some embodiments, when the communications device 270 moves from one cell to another within the same communications network, while in connected mode or inactive mode, the radio access node (e.g. gNB A 272 of FIG. 4) forwards the assistance information indication (e.g. as received in step S408 of FIG. 4) to the radio access node which controls the new cell in which the communications device is being served.

Accordingly, in some embodiments, the process of FIG. 5 is modified such that step S520 is reached after step S514 only if both of two conditions are met, the conditions being that i) the communications device is in idle mode in the other network (NW B) and ii) the assistance information is no longer valid in NW A.

In some embodiments, the assistance information is no longer valid in NW A if the communications device is in idle mode and has left the pre-determined region of NW A.

In some embodiments, validity of the assistance information indication is configured in terms of a time and/or a location. That is, the network (e.g. the gNB A 272 or AMF A 276 of FIG. 4) may transmit a validity indication to the communications device 270 to indicate when the assistance information indication 456 will no longer be taken into account by the network in scheduling downlink transmissions.

In some embodiments, there may be no validity time period; that is, the assistance information indication remains valid indefinitely. In some embodiments, the assistance information indication remains valid until certain predetermined criteria (the criteria not being based on time since the transmission of the validity information) are met.

For example, the validity indication may indicate that the assistance information indication 456 remains valid until 48 hours from when it was transmitted, or until the communications device 270 leaves one of a set of one or more cells, whichever occurs first. The set of cells may be represented by a set of one or more tracking areas identified by their respective tracking area identities or may correspond to a RAN notification area. The communications device 270 may thus determine that the assistance information is no longer valid in NW A by comparing a tracking area identity broadcast in system information in a current cell with a tracking area identity of the cell in which the tracking area identities (or identity) indicated in the validity indication.

The validity indication may be transmitted as part of system information or within UE specific signalling (e.g. within one or more unicast RRC configuration message).

In some embodiments, a core network entity (such as the AMF A 276) may control a number of tracking areas and/or may forward the assistance information indication to another core network entity in response to determining that the communications device 270 is located within a tracking area controlled by the other core network entity. Thus, the validity may extend over multiple tracking areas.

Thus, embodiments can provide for a reduced frequency for transmitting the assistance information indication.

Selection of Network Based on Radio Technology

In the process illustrated in FIG. 5, the process starts at step S504 in response to entering a connected mode in either network in which the communications device 270 is registered.

In some embodiments, the determination to transmit assistance information is further based on a radio technology used in the current cells in which the communications device 270 is being served, in the respective networks.

For example, in the scenario in FIG. 3, the first infrastructure equipment 272 may generate in the first cell 310 a wireless access interface in accordance with 3GPP LTE (or its subsequent variants, such as LTE-A, or '3GPP 4G'). The communications device 270 may thus be served by the first cell 310 in the first network (NW A) operating using 3GPP LTE. The second infrastructure equipment may generate in the second cell 320 a wireless access interface in accordance with specifications for 3GPP New Radio (NR) or '3GPP 5G'. Thus in the second network (NW B), the communications device 270 may be served by a cell operating using 3GPP NR.

Radio technologies may differ in their ability to modify or apply restrictions to the transmission timing of downlink transmissions. For example, generally, LTE has less flexibility than NR in this respect. Accordingly, in some embodiments, the communications device 270 preferably transmits the assistance information indication in an NR cell.

In some embodiments, the communications device 270 may transmit the assistance information indication 456 in a cell of a first network based on a determination that the network is associated with a higher preference for transmitting the assistance information indication than a second network.

In some embodiments, the determination may be based on a determination that the cell of the first network operates using a first radio technology, different from a second radio technology used in a cell of the second network in which the communications device is registered, in response to determining that the first radio technology is associated with a higher preference for transmitting the assistance information indication than the second radio technology.

In some embodiments, 3GPP NR has a higher preference than 3GPP LTE.

In some embodiments, a determination that the network is associated with a higher preference for transmitting the assistance information indication than a second network is based on a determination that infrastructure equipment of the first network supports the transmission by the communications device of the assistance information indication and that infrastructure equipment of the second network does not support the transmission by the communications device of the assistance information indication.

A cell operating according to 3GPP LTE may conventionally transmit paging messages in paging opportunities (POs) selected in accordance with one of a plurality of predetermined PO schedules.

In some embodiments, in order to further facilitate effective determination of assistance information, all 3GPP LTE cells in a particular network are configured to schedule POs in accordance with the same PO schedule. Preferably, an indication of the selected PO schedule is transmitted in the 3GPP LTE cells.

In some embodiments, the assistance information indication comprises an indication that the communications device is operating in a cell of the second network which operates using 3GPP LTE and comprises an indication of the selected PO schedule applicable in the 3GPP LTE cell of the second network.

Based on a determination of the selected PO schedule applicable in a particular first network, the communications device 270 may determine the assistance information for transmitting in another second network. Because the PO schedule is the same in all 3GPP LTE cells in the first network, the assistance information may ensure that the second network schedules downlink transmissions which do not prevent the communications device 270 from receiving paging messages in the first network, even if the communications device 270 changes cells in the first network, e.g. as a result of cell reselection.

In some embodiments, the steps of the described processes may be modified or re-ordered, and some steps may be omitted. For example, in some embodiments, steps S508 and S522 may be omitted, and the process may end if no request is received at step S506.

In some embodiments, the assistance information indication 456 allows the first infrastructure equipment 272 to select a time for a downlink transmission that ensures that the communications device 270 is able to receive that downlink transmission, and is not thereby prevented from receiving a further downlink transmission in the second network, when the further downlink transmission is transmitted in one of a pre-determined plurality of transmission opportunities (e.g. paging opportunities).

In some embodiments, the assistance information indication 456 allows the first infrastructure equipment 272 to select a time for a downlink transmission that ensures that, with high probability, the communications device 270 is not prevented from receiving a downlink transmission in the second network, when the downlink transmission is transmitted in one of a pre-determined plurality of transmission opportunities (e.g. paging opportunities). For example, it may not be possible for the (adjusted) paging opportunities in the first network to be entirely mutually compatible with (e.g. to not overlap with) paging opportunities in the second network. Additionally or alternatively it may not be possible to indicate accurately in the assistance information indication all time periods during which the communications device may receive downlink transmissions in the second network. Accordingly in some embodiments of the present technique there may be time periods where the communications device is required to monitor both networks, such that the communications device, monitoring one of the networks, fails to receive a downlink transmission for it, transmitted in the other network.

In some embodiments, the communications device 270 determines a relative timing of paging cycles applicable to it in each of the first and second networks, and transmits, e.g. as part of the assistance information indication 456, an indication of a timing offset between the paging cycles. Accordingly, the network in which the indication is received is able, based on the paging cycle applicable to the communications device 270 in that network, and the indication, to determine the paging cycle timing applicable to the communications device 270 in the other network.

Embodiments can therefore provide a method of communicating using a communications device registered in a first communications network and a second communications network, the first and second communications networks being cellular wireless communications networks, the method comprising: determining a plurality of time periods during which a downlink transmission for the communications device may be received in the first communications network according to a time divided schedule, transmitting an assistance information indication in the second communications network, controlling a receiver of the communications device to monitor a wireless access interface in the second communications network for a downlink transmission for the communications device at a first monitoring time, wherein the assistance information indication is for the second communications network to select, as a first transmission time for transmitting the downlink transmission, the first monitoring time, such that the communications device is not prevented from receiving another downlink transmission for the communications device transmitted in the first communications network during one or more of the plurality of time periods, by monitoring the wireless access interface in the second communications network at the first monitoring time.

Embodiments may further provide a method of communicating with a communications device by an infrastructure equipment in a first wireless communications network, the method comprising: receiving from the communications device an assistance information indication for permitting the first communications network to determine a transmission time for transmitting a downlink transmission such that the communications device is able to receive the downlink transmission at the transmission time and is not prevented from receiving another downlink transmission transmitted in a second wireless communications network by the receiving the downlink transmission message at the transmission time, and transmitting the assistance information indication to another infrastructure equipment or a core network part of the first wireless communications network.

Embodiments may further provide a method of communicating using an infrastructure equipment in a wireless communications network, the method comprising: receiving from the core network part a paging request for a communications device, receiving an assistance information indication, the assistance information indication for permitting the infrastructure equipment to determine a paging time for transmitting a paging message such that the communications device is able to receive the paging message at the paging time and is not prevented from receiving a paging message transmitted in a second wireless communications network by the receiving the paging message at the paging time, determining the paging time for transmitting the paging message to the communications device based on the assistance information indication, and transmitting the paging message at the paging time.

Embodiments may further provide a method of operating a core network part of a first wireless communications network, the method comprising: receiving from an infrastructure equipment of the first wireless communications network an assistance information indication received from a communications device, the assistance information indication for use by an infrastructure equipment of the first wireless communications network in determining a first transmission time for transmitting a downlink transmission such that the communications device is not prevented from receiving another downlink transmission for the communications device transmitted in a second wireless communications network during a plurality of time periods by receiving the downlink transmission at the first transmission time in the first wireless communications network, after receiving the assistance information indication, determining that downlink data is to be transmitted to the communications device, in response to determining that that downlink data is to be transmitted to the communications device, transmitting a paging message and the assistance information indication to the infrastructure equipment of the first wireless communications network.

Corresponding infrastructure equipment, communications devices and core network entities and circuitry, and computer readable media are also provided by embodiments of the present disclosure.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein.

It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communications devices/IoT devices or other narrowband communications devices, but can be applied more generally, for example in respect of any type communications device operating with a wireless link to the communication network.

It will further be appreciated that the principles described herein are not applicable only to LTE- and NR-based wireless telecommunications systems, but are applicable for any type of wireless telecommunications system.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of communicating using a communications device registered in a first communications network and a second communications network, the first and second communications networks being cellular wireless communications networks, the method comprising: determining a plurality of time periods during which a downlink transmission for the communications device may be received in the first communications network according to a time divided schedule, transmitting an assistance information indication in the second communications network, controlling a receiver of the communications device to monitor a wireless access interface in the second communications network for a downlink transmission for the communications device at a first monitoring time, wherein the assistance information indication is for the second communications network to select, as a first transmission time for transmitting the downlink transmission, the first monitoring time, such that the communications device is not prevented from receiving another downlink transmission for the communications device transmitted in the first communications network during one or more of the plurality of time periods, by monitoring the wireless access interface in the second communications network at the first monitoring time.

Paragraph 2. A method according to paragraph 1, the method comprising receiving in the second wireless communications network the downlink transmission for the communications device at the first monitoring time.

Paragraph 3. A method according to paragraph 1 or paragraph 2, wherein the assistance information indication is for the second communications network to select, as the first transmission time for transmitting the downlink transmission, the first monitoring time, such that the communications device is not prevented from receiving another downlink transmission for the communications device transmitted in the first communications network during any of the plurality of time periods, by monitoring the wireless access interface in the second communications network at the first monitoring time.

Paragraph 4. A method according to any of paragraphs 1 to 3, wherein the plurality of time periods correspond to paging opportunities during which a paging message for the communications device may be transmitted in the first communications network.

Paragraph 5. A method according to any of paragraphs 1 to 4, wherein the downlink transmission for the communications device transmitted at the first transmission time is a paging message indicating that the second communications network has downlink data for transmission to the communications device, and at the first transmission time, the communications device is in an idle mode in the second communications network.

Paragraph 6. A method according to any of paragraphs 1 to 4, wherein the downlink transmission for the communications device transmitted at the first transmission time is a control message comprising an indication of communications resources allocated for the transmission of downlink data to the communications device, and at the first transmission time, the communications device is in a connected mode in the second communications network.

Paragraph 7. A method according to any of paragraphs 1 to 6, the method comprising entering the connected mode in a second communications network, wherein entering the connected mode comprises the transmitting the assistance information indication.

Paragraph 8. A method according to any of paragraphs 1 to 6, wherein the assistance information indication is transmitted while the communications device is in the connected mode.

Paragraph 9. A method according to any of paragraphs 1 to 8, wherein the assistance information indication is transmitted in a first cell of the second communications network, and the wireless access interface is provided in a second cell of the second communications network.

Paragraph 10. A method according to any of paragraphs 1 to 9, the method comprising transmitting in the second network an indication that the communications device is capable of transmitting the assistance information indication.

Paragraph 11. A method according to any of paragraphs 1 to 10, the method comprising: receiving in the second communications network an assistance information request indication, wherein the transmitting the assistance information indication in the second communications network is in response to receiving the assistance information request indication.

Paragraph 12. A method according to any of paragraphs 1 to 9, the method comprising: receiving in the first communications network an assistance information request indication, and in response to the transmitting the assistance information indication in the second communications network and receiving in the first communications network the assistance information request indication, refraining from transmitting an assistance information indication in the first communications network.

Paragraph 13. A method according to any of paragraphs 1 to 12, the method comprising: controlling a receiver of the communications device to monitor during the plurality of time periods the first communications network and controlling the receiver of the communications device to monitor during time periods other than the plurality of time periods the second communications network.

Paragraph 14. A method according to any of paragraphs 1 to 13, the method comprising determining a duration of a paging cycle for the communications device in the first network, wherein the assistance information indication comprises an indication of the paging cycle for the communications device in the first network.

15. A method according to any of paragraphs 1 to 14, the method comprising determining a time offset between a paging cycle for the communications device in the first network and a paging cycle for the communications device in the second network, wherein the assistance information indication comprises an indication of the time offset.

Paragraph 16. A method of communicating with a communications device by an infrastructure equipment in a first wireless communications network, the method comprising: receiving from the communications device an assistance information indication for permitting the first communications network to determine a transmission time for transmitting a downlink transmission such that the communications device is able to receive the downlink transmission at the transmission time and is not prevented from receiving another downlink transmission transmitted in a second wireless communications network by the receiving the downlink transmission message at the transmission time, and transmitting the assistance information indication to another infrastructure equipment or a core network part of the first wireless communications network.

Paragraph 17. A method according to paragraph 16, wherein the assistance information indication indicates that the communications device is registered simultaneously with the first wireless communications network and with the second wireless communications network.

Paragraph 18. A method according to paragraph 16 or paragraph 17, the method comprising receiving an indication that the communications device is capable of transmitting the assistance information indication.

Paragraph 19. A method according to any of paragraphs 16 to 18, the method comprising: in response to receiving the indication that the communications device is capable of transmitting the assistance information indication, transmitting an assistance information request indication.

Paragraph 20. A method according to any of paragraphs 16 to 19, the method comprising determining that the communications device is to change, or has changed serving cell to a new serving cell, wherein the other infrastructure equipment is associated with the new serving cell, and the transmitting the assistance information indication to the infrastructure equipment or the core network part of the first wireless communications network comprises transmitting the assistance information indication to the other infrastructure equipment in response to the determining.

Paragraph 21. A method of communicating using an infrastructure equipment in a wireless communications network, the method comprising: receiving from the core network part a paging request for a communications device, receiving an assistance information indication, the assistance information indication for permitting the infrastructure equipment to determine a paging time for transmitting a paging message such that the communications device is able to receive the paging message at the paging time and is not prevented from receiving a paging message transmitted in a second wireless communications network by the receiving the paging message at the paging time, determining the paging time for transmitting the paging message to the communications device based on the assistance information indication, and transmitting the paging message at the paging time.

Paragraph 22. A method according to paragraph 21, wherein the assistance information indication is received from the core network part.

Paragraph 23. A method according to paragraph 21, wherein the assistance information indication is received from another infrastructure equipment of the wireless communications network.

Paragraph 24. A method according to paragraph 23, wherein the assistance information indication is transmitted by the other infrastructure equipment in response to determining that the communications device is to change, or has changed serving cell to a new serving cell associated with the infrastructure equipment.

Paragraph 25. A method of operating a core network part of a first wireless communications network, the method comprising: receiving from an infrastructure equipment of the first wireless communications network an assistance information indication received from a communications device, the assistance information indication for use by an infrastructure equipment of the first wireless communications network in determining a first transmission time for transmitting a downlink transmission such that the communications device is not prevented from receiving another downlink transmission for the communications device transmitted in a second wireless communications network during a plurality of time periods by receiving the downlink transmission at the first transmission time in the first wireless communications network, after receiving the assistance information indication, determining that downlink data is to be transmitted to the communications device, in response to determining that that downlink data is to be transmitted to the communications device, transmitting a paging message and the assistance information indication to the infrastructure equipment of the first wireless communications network.

Paragraph 26. A communications device, the communications device comprising a transmitter configured to transmit signals via a first wireless access interface provided by a first infrastructure equipment of a first communications network and to transmit signals via a wireless access interface provided by a second infrastructure equipment of a second communications network, the first and second communications networks being cellular wireless communications networks, a receiver configured to receive signals via the first wireless access interface and the second wireless access interface, and a controller configured to control the transmitter and the receiver so that the communications device is operable: to determine a plurality of time periods during which a downlink transmission for the communications device may be received in the first communications network according to a time divided schedule, to transmit an assistance information indication in the second communications network, to monitor a wireless access interface in the second communications network for a downlink transmission for the communications device at a first monitoring time, wherein the assistance information indication is for the second communications network to select, as a first transmission time for transmitting the downlink transmission, the first monitoring time, such that the communications device is not prevented from receiving another downlink transmission for the communications device transmitted in the first communications network during one or more of the plurality of time periods, by monitoring the wireless access interface in the second communications network at the first monitoring time.

Paragraph 27. Circuitry for a communications device, the circuitry comprising transmitter circuitry configured to transmit signals via a first wireless access interface provided by a first infrastructure equipment of a first communications network and to transmit signals via a wireless access interface provided by a second infrastructure equipment of a second communications network, the first and second communications networks being cellular wireless communications networks, receiver circuitry configured to receive signals via the first wireless access interface and the second wireless access interface, and controller circuitry configured to control the transmitter circuitry and the receiver circuitry so that the communications device is operable: to determine a plurality of time periods during which a downlink transmission for the communications device may be received in the first communications network according to a time divided schedule, to transmit an assistance information indication in the second communications network, to monitor a wireless access interface in the second communications network for a downlink transmission for the communications device at a first monitoring time, wherein the assistance information indication is for the second communications network to select, as a first transmission time for transmitting the downlink transmission, the first monitoring time, such that the communications device is not prevented from receiving another downlink transmission for the communications device transmitted in the first communications network during one or more of the plurality of time periods, by monitoring the wireless access interface in the second communications network at the first monitoring time.

Paragraph 28. Infrastructure equipment for use in a wireless communications network, the wireless communications network comprising the infrastructure equipment providing a wireless access interface in a cell and a core network part, the infrastructure equipment comprising a transmitter configured to transmit signals to a communications device via the wireless access interface in the cell, a receiver configured to receive data from the communications device, and a controller configured to control the transmitter and the receiver so that the infrastructure equipment is operable: to receive from the communications device an assistance information indication for permitting the first communications network to determine a transmission time for transmitting a downlink transmission such that the communications device is able to receive the downlink transmission at the transmission time and is not prevented from receiving another downlink transmission transmitted in a second wireless communications network by the receiving the downlink transmission message at the transmission time, and to transmit the assistance information indication to another infrastructure equipment or a core network part of the first wireless communications network.

Paragraph 29. Circuitry for infrastructure equipment for use in a wireless communications network, the wireless communications network comprising the infrastructure equipment providing a wireless access interface in a cell and a core network part, the circuitry comprising transmitter circuitry configured to transmit signals to a communications device via the wireless access interface in the cell, receiver circuitry configured to receive data from the communications device, and controller circuitry configured to control the transmitter circuitry and the receiver circuitry so that the infrastructure equipment is operable: to receive from the communications device an assistance information indication for permitting the first communications network to determine a transmission time for transmitting a downlink transmission such that the communications device is able to receive the downlink transmission at the transmission time and is not prevented from receiving another downlink transmission transmitted in a second wireless communications network by the receiving the downlink transmission message at the transmission time, and to transmit the assistance information indication to another infrastructure equipment or a core network part of the first wireless communications network.

Paragraph 30. Infrastructure equipment for use in a wireless communications network, the wireless communications network comprising the infrastructure equipment providing a wireless access interface in a cell and a core network part, the infrastructure equipment comprising a transmitter configured to transmit signals to a communications device via the wireless access interface in the cell, a receiver configured to receive data from the communications device, and a controller configured to control the transmitter and the receiver so that the infrastructure equipment is operable: to receive from the core network part a paging request for the communications device, to receive an assistance information indication, the assistance information indication for permitting the infrastructure equipment to determine a paging time for transmitting a paging message such that the communications device is able to receive the paging message at the paging time and is not prevented from receiving a paging message transmitted in a second wireless communications network by the receiving the paging message at the paging time, to determine the paging time for transmitting the paging message to the communications device based on the assistance information indication, and to transmit the paging message at the paging time.

Paragraph 31. Circuitry for infrastructure equipment for use in a wireless communications network, the wireless communications network comprising the infrastructure equipment providing a wireless access interface in a cell and a core network part, the infrastructure equipment comprising transmitter circuitry configured to transmit signals to a communications device via the wireless access interface in the cell, receiver circuitry configured to receive data from the communications device, and controller circuitry configured to control the transmitter circuitry and the receiver circuitry so that the infrastructure equipment is operable: to receive from the core network part a paging request for the communications device, to receive an assistance information indication, the assistance information indication for permitting the infrastructure equipment to determine a paging time for transmitting a paging message such that the communications device is able to receive the paging message at the paging time and is not prevented from receiving a paging message transmitted in a second wireless communications network by the receiving the paging message at the paging time, to determine the paging time for transmitting the paging message to the communications device based on the assistance information indication, and to transmit the paging message at the paging time.

Paragraph 32. A core network element of a first wireless communications network, the wireless communications network comprising infrastructure equipment providing a wireless access interface in a cell, the core network element comprising a controller configured to control the core network element so that the core network element is operable: to receive from the infrastructure equipment an assistance information indication received from a communications device, the assistance information indication for use by an infrastructure equipment of the first wireless communications network in determining a first transmission time for transmitting a downlink transmission such that the communications device is not prevented from receiving another downlink transmission for the communications device transmitted in a second wireless communications network during a plurality of time periods by receiving the downlink transmission at the first transmission time in the first communications network, after receiving the assistance information indication, to determine that downlink data is to be transmitted to the communications device, and in response to determining that that downlink data is to be transmitted to the communications device, to transmit a paging message and the assistance information indication to the infrastructure equipment.

Paragraph 33. Circuitry for a core network element of a first wireless communications network, the wireless communications network comprising infrastructure equipment providing a wireless access interface in a cell, the circuitry comprising controller circuitry configured to control the core network element so that the core network element is operable: to receive from the infrastructure equipment an assistance information indication received from a communications device, the assistance information indication for use by an infrastructure equipment of the first wireless communications network in determining a first transmission time for transmitting a downlink transmission such that the communications device is not prevented from receiving another downlink transmission for the communications device transmitted in a second wireless communications network during a plurality of time periods by receiving the downlink transmission at the first transmission time in the first communications network, after receiving the assistance information indication, to determine that downlink data is to be transmitted to the communications device, and in response to determining that that downlink data is to be transmitted to the communications device, to transmit a paging message and the assistance information indication to the infrastructure equipment.

REFERENCES

[1] RP-182090, "Revised SID: Study on NR Industrial Internet of Things (IoT)," RAN #81.
[2] Holma H. and Toskala A, "LTE for UMTS OFDMA and SC-FDMA based radio access", John Wiley and Sons, 2009
[3] 3GPP TS 23.501 "System architecture for the 5G System (5GS)", Release 16
[4] RFC 4187 Extensible Authentication Protocol Method for 3rd Generation Authentication and Key Agreement (EAP-AKA)
[5] 3GPP TS 38.331 "NR; Radio Resource Control (RRC); Protocol specification", Release 15
[6] 3GPP TS 38.300 "NR; Overall description; Stage-2", Release 15
[7] 3GPP TS 36.331 "Evolved Universal Terrestrial Radio Access (E-UTRA); Radio Resource Control (RRC); Protocol specification", Release 15

The invention claimed is:
1. A method of communicating using a communications device registered in a first communications network and a second communications network, the first and second communications networks being cellular wireless communications networks, the method comprising:
    determining a plurality of time periods during which a downlink transmission for the communications device may be received in the first communications network according to a time divided schedule,
    transmitting an assistance information indication in the second communications network, controlling a receiver of the communications device to monitor a wireless access interface in the second communications network for a downlink transmission for the communications device at a first monitoring time, and transmitting in the second network an indication that the communications device is capable of transmitting the assistance information indication, wherein the assistance information indication is for the second communications network to select, as a first transmission time for transmitting the downlink transmission, the first monitoring time, such that the communications device is not prevented from receiving another downlink transmission for the communications device transmitted in the first communications network during one or more of the plurality of time periods, by monitoring the wireless access interface in the second communications network at the first monitoring time.

2. The method according to claim 1, the method comprising receiving in the second wireless communications network the downlink transmission for the communications device at the first monitoring time.

3. The method according to claim 1, wherein the assistance information indication is for the second communications network to select, as the first transmission time for transmitting the downlink transmission, the first monitoring time, such that the communications device is not prevented from receiving another downlink transmission for the communications device transmitted in the first communications network during any of the plurality of time periods, by monitoring the wireless access interface in the second communications network at the first monitoring time.

4. The method according to claim 1, wherein the plurality of time periods correspond to paging opportunities during which a paging message for the communications device may be transmitted in the first communications network.

5. The method according to claim 1, wherein the downlink transmission for the communications device transmitted at the first transmission time is a paging message indicating that the second communications network has downlink data for transmission to the communications device, and
   at the first transmission time, the communications device is in an idle mode in the second communications network.

6. The method according to claim 1, wherein the downlink transmission for the communications device transmitted at the first transmission time is a control message comprising an indication of communications resources allocated for the transmission of downlink data to the communications device, and
   at the first transmission time, the communications device is in a connected mode in the second communications network.

7. The method according to claim 1, the method comprising entering the connected mode in a second communications network, wherein entering the connected mode comprises the transmitting the assistance information indication.

8. The method according to claim 1, wherein the assistance information indication is transmitted while the communications device is in the connected mode.

9. The method according to claim 1, wherein
   the assistance information indication is transmitted in a first cell of the second communications network, and
   the wireless access interface is provided in a second cell of the second communications network.

10. The method according to claim 1, the method comprising:

receiving in the second communications network an assistance information request indication, wherein
the transmitting the assistance information indication in the second communications network is in response to receiving the assistance information request indication.

11. The method according to claim 1, the method comprising:
   receiving in the first communications network an assistance information request indication, and
   in response to the transmitting the assistance information indication in the second communications network and receiving in the first communications network the assistance information request indication, refraining from transmitting an assistance information indication in the first communications network.

12. The method according to claim 1, the method comprising:
   controlling a receiver of the communications device to monitor during the plurality of time periods the first communications network and
   controlling the receiver of the communications device to monitor during time periods other than the plurality of time periods the second communications network.

13. The method according to claim 1, the method comprising determining a duration of a paging cycle for the communications device in the first network, wherein the assistance information indication comprises an indication of the paging cycle for the communications device in the first network.

14. The method according to claim 1, the method comprising determining a time offset between a paging cycle for the communications device in the first network and a paging cycle for the communications device in the second network, wherein the assistance information indication comprises an indication of the time offset.

15. A method of communicating with a communications device by an infrastructure equipment in a first wireless communications network, the method comprising:
   receiving from the communications device an assistance information indication for permitting the first wireless communications network to determine a transmission time for transmitting a downlink transmission such that the communications device is able to receive the downlink transmission at the transmission time and is not prevented from receiving another downlink transmission transmitted in a second wireless communications network by receiving the downlink transmission at the transmission time,
   transmitting the assistance information indication to another infrastructure equipment or a core network part of the first wireless communications network, and
   transmitting in the second wireless communications network an indication that the communications device is capable of transmitting the assistance information indication.

16. The method according to claim 15, wherein the assistance information indication indicates that the communications device is registered simultaneously with the first wireless communications network and with the second wireless communications network.

17. The method according to claim 15, the method comprising:
   in response to receiving the indication that the communications device is capable of transmitting the assistance information indication, transmitting an assistance information request indication.

18. A method of operating a core network part of a first wireless communications network, the method comprising:

receiving from an infrastructure equipment of the first wireless communications network an assistance information indication received from a communications device, the assistance information indication for use by the infrastructure equipment of the first wireless communications network in determining a first transmission time for transmitting a downlink transmission such that the communications device is not prevented from receiving another downlink transmission for the communications device transmitted in a second wireless communications network during a plurality of time periods by receiving the downlink transmission at the first transmission time in the first wireless communications network, after receiving the assistance information indication, determining that downlink data is to be transmitted to the communications device, in response to determining that downlink data is to be transmitted to the communications device, transmitting a paging message and the assistance information indication to the infrastructure equipment of the first wireless communications network, wherein the method further includes receiving in the second wireless communications network an indication that the communications device is capable of transmitting the assistance information indication.

\* \* \* \* \*